(12) United States Patent
Egli

(10) Patent No.: US 7,314,063 B2
(45) Date of Patent: Jan. 1, 2008

(54) SINGLE-LEVER MIXING VALVE WITH STIRRUP-SHAPED HANDLE

(75) Inventor: Werner Egli, Hüntwangen (CH)

(73) Assignee: ARWA AG, Wallisellen (CH)

( * ) Notice: Subject to any disclaimer, the term of this patent is extended or adjusted under 35 U.S.C. 154(b) by 11 days.

(21) Appl. No.: 11/295,474

(22) Filed: Dec. 7, 2005

(65) Prior Publication Data
US 2006/0130916 A1 Jun. 22, 2006

(30) Foreign Application Priority Data
Dec. 16, 2004 (EP) .................................. 04405779

(51) Int. Cl.
F16K 11/18 (2006.01)

(52) U.S. Cl. ............................. 137/636.3; 137/636.2; 137/625.5

(58) Field of Classification Search ............. 137/636.3, 137/636.2, 636, 625.4, 625.41
See application file for complete search history.

(56) References Cited
U.S. PATENT DOCUMENTS
3,958,601 A * 5/1976 Schmitt ................... 137/636.2
4,687,025 A * 8/1987 Kahle et al. ............ 137/625.17
4,705,072 A * 11/1987 Egli ....................... 137/625.17

FOREIGN PATENT DOCUMENTS

| DE | 33-27-776 A1 | 8/1983 |
| DE | 3427-959 A1 | 7/1984 |
| DE | 3503-583 A1 | 2/1985 |
| DE | 37-43-212 A1 | 12/1987 |
| DE | 41-05-387 C1 | 2/1991 |
| EP | 0-237-473 A1 | 2/1987 |

* cited by examiner

Primary Examiner—Kevin Lee
(74) Attorney, Agent, or Firm—Sughrue Mion Pllc.

(57) ABSTRACT

A single-lever mixing valve with stirrup-shaped handle (9) comprises a mixing cartridge (2) which is arranged in a fitting housing (1) and projects with an actuating shank (14), pivotable about a pivot axis (16), into a handle head (18) closed off to the outside, it being possible for the actuating shank (14) to be actuated by the stirrup-shaped handle (9) via pins (11, 11') leading into the handle head (18).

In such a single-lever mixing valve, increased hygiene and an improved visual impression are achieved in a simple construction by the pins (11, 11') being rotatably mounted about a rotation axis (17) which is in alignment with the pivot axis (16) of the actuating shank (14).

15 Claims, 4 Drawing Sheets

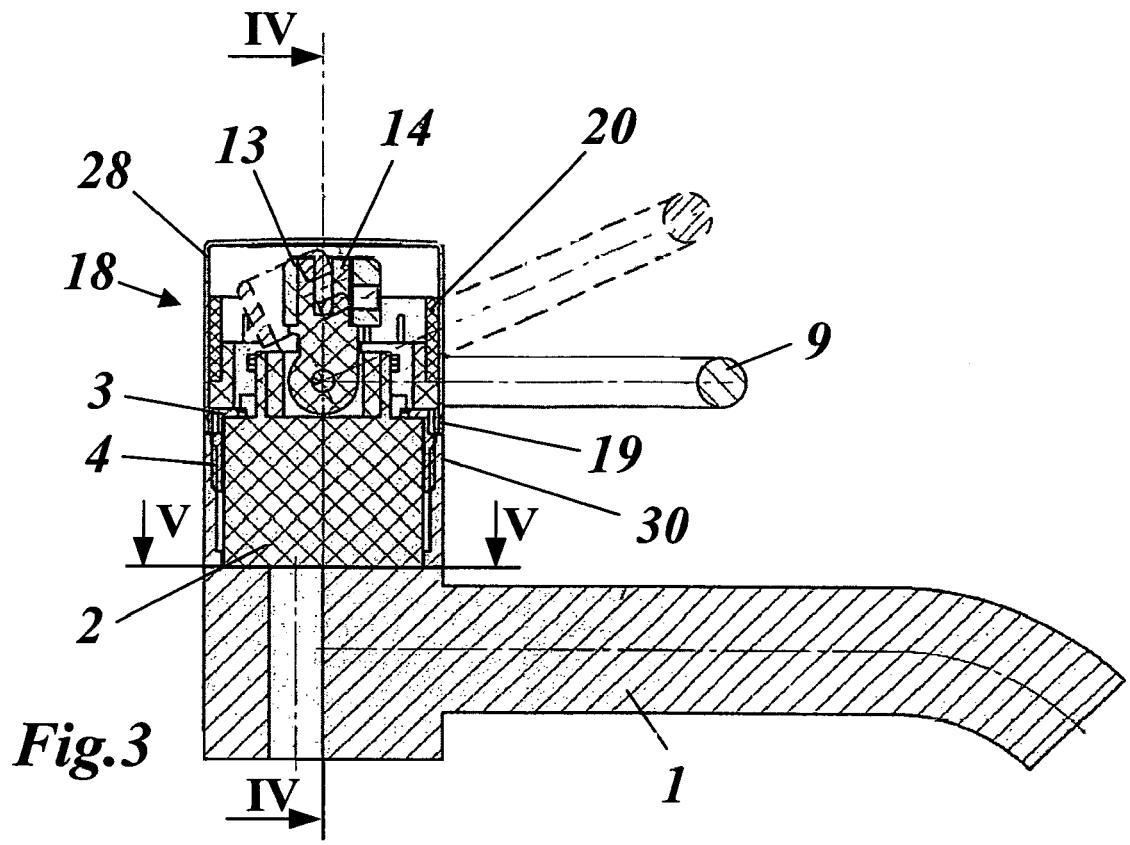
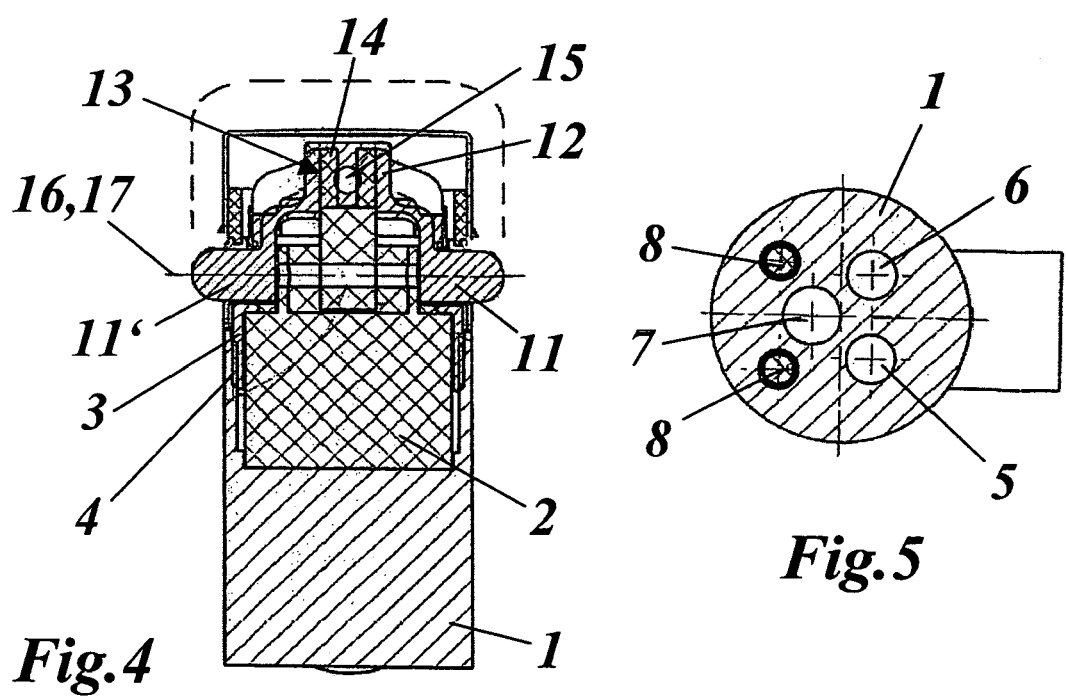

SINGLE-LEVER MIXING VALVE WITH STIRRUP-SHAPED HANDLE

TECHNICAL FIELD

The present invention relates to the field of sanitary fittings. It relates to a single-lever mixing valve with stirrup-shaped handle according to the preamble of claim 1.

Such a single-lever mixing valve has been disclosed, for example, by DE-A1-3743 212.

PRIOR ART

Single-lever mixing valves with a stirrup-shaped handle for the actuation of the valve are known from the prior art. Such valve actuations are as a rule used in ceramic disc cartridges in which a first valve disc is firmly connected to the housing and a second valve disc is connected to an actuating shank in a rotatable manner and in such a way as to be displaceable in one direction.

Publication EP-A1-0 237 473 shows (in FIGS. 1 and 2) an actuating arrangement in which a control shaft (5), which is rotatably mounted in the horizontal through-bore (46) of a guide part (43), projects up to a lateral surface of the housing (32) and is connected there to the stirrup (3) by means of serrations (6) and sleeves (7). A control pin (15) is rigidly secured in the control shaft and displaces the top movable ceramic disc (20) via a connecting piece (18) for setting the flow rate. To set the mixture ratio, the top ceramic disc (20) can be rotated about a vertical axis via the guide part (43).

A disadvantage with this known embodiment is that commercially available cartridges, which as a rule have an actuating shank with a top square for fastening a handle, cannot be used. A further disadvantage is that the connection of the stirrup (3) to the control pin (15) is comparatively complicated in production and assembly on account of the multiplicity of individual parts (control shaft, sleeves, screws) and the serrations used.

A further embodiment of an actuating arrangement has been disclosed by publication DE-A1-37 43 212. In this embodiment (see FIGS. 1-4), the one-piece hand lever (3) designed as a stirrup is connected to the inner lever (11) of a mixing cartridge (5) in a rotationally fixed manner by means of a square. The inner lever (11) is pivotable about a horizontal pivot bearing axis (51). The hand lever (3) is guided above the pivot bearing axis (51) with pins (31) through through-openings (23) in the lever head housing (2). During the pivoting of the hand lever (3), the pins (31) move onto an arc of a circle about the pivot bearing axis (51). This inevitably means that the through-openings (23) have to be designed as annular curved pieces (24), which is disadvantageous for the design and hygiene.

DE-A1-34 27 959 has disclosed a single-lever mixer (FIGS. 4, 5) in which the cartridge is actuated by an operating lever whose fork arms are connected by a stirrup, pin sections lying between the fork arms and the stirrup running coaxially to the pivot axis of the cartridge. Independent mounting of the pin sections is not provided here.

Finally, DE-C1-41 05 387 has disclosed a single-lever mixing fitting in which a shaft running coaxially to the pivot axis of the actuating lever of the cartridge passes through said actuating lever, which is connected to this shaft in a rotationally fixed manner. A stirrup-like lever is fastened as operating element to the ends of the shaft. A central pivot bearing is provided for the shaft, which is put through this central pivot bearing. This construction requires a complicated configuration and fastening of shaft and operating lever.

DESCRIPTION OF THE INVENTION

The object of the invention is to provide a single-lever mixing valve with stirrup-shaped handle, this single-lever mixing valve avoiding the disadvantages of known embodiments and being distinguished, in particular in a simple construction, by increased hygiene and an improved optical impression.

The object is achieved by all the features of claim 1 in their entirety. The essence of the invention consists in using a standard cartridge for the valve function and in connecting the actuating shank of the standard cartridge to the stirrup-shaped handle via pins which emerge from the handle head and whose rotation axis coincides with the pivot axis of the actuating shank, a top and a bottom guide sleeve being connected to one another inside the handle head, and the pins being rotatably mounted between the two guide sleeves. The two guide sleeves are releasably connected to one another in particular by first snap connections.

The pins are preferably rotatably mounted between the guide sleeves in a bearing formed from two bearing halves, the bearing halves being assigned to the guide sleeves and each being fastened to the associated guide sleeve. In particular, the bearing halves are releasably fastened to the associated guide sleeves by second snap connections.

The handle head is preferably covered on the outside by a hood which can be put over the guide sleeves and which is arranged concentrically to the guide sleeves and is releasably held on the bottom guide sleeve. Lugs are advantageously arranged in a distributed manner on the outer circumference of the bottom guide sleeve in order to releasably retain the hood, these lugs being in engagement with an encircling groove on the inside of the hood. The hood has corresponding recesses for putting over the pins.

The bearing halves have end faces which are visible from outside the handle head and which are designed as decorative faces or are designed to be coloured, in particular red/blue, for marking the direction of rotation of the mixing valve in the sense of hot/cold.

The pins are preferably connected to a yoke inside the handle head, which yoke is in turn connected to the actuating shank. The actuating shank is expediently designed as a square, and the yoke sits with a corresponding square aperture on the actuating shank, the yoke being fixed on the actuating shank by means of a screw.

It is especially simple and visually attractive if the stirrup-shaped handle, the pins and the yoke are sections of a one-piece actuating element.

BRIEF EXPLANATION OF THE FIGURES

The invention is to be explained in more detail below with reference to exemplary embodiments in connection with the drawing, in which:

FIG. 3 shows a sectional view of the mixing valve from FIG. 2 along section line III-III in FIG. 2;

FIG. 4 shows a sectional view of the mixing valve from FIG. 3 along section line IV-IV in FIG. 3;

FIG. 5 shows a sectional view of the mixing valve from FIG. 3 along section line V-V in FIG. 3;

WAYS OF IMPLEMENTING THE INVENTION

Figure 6:
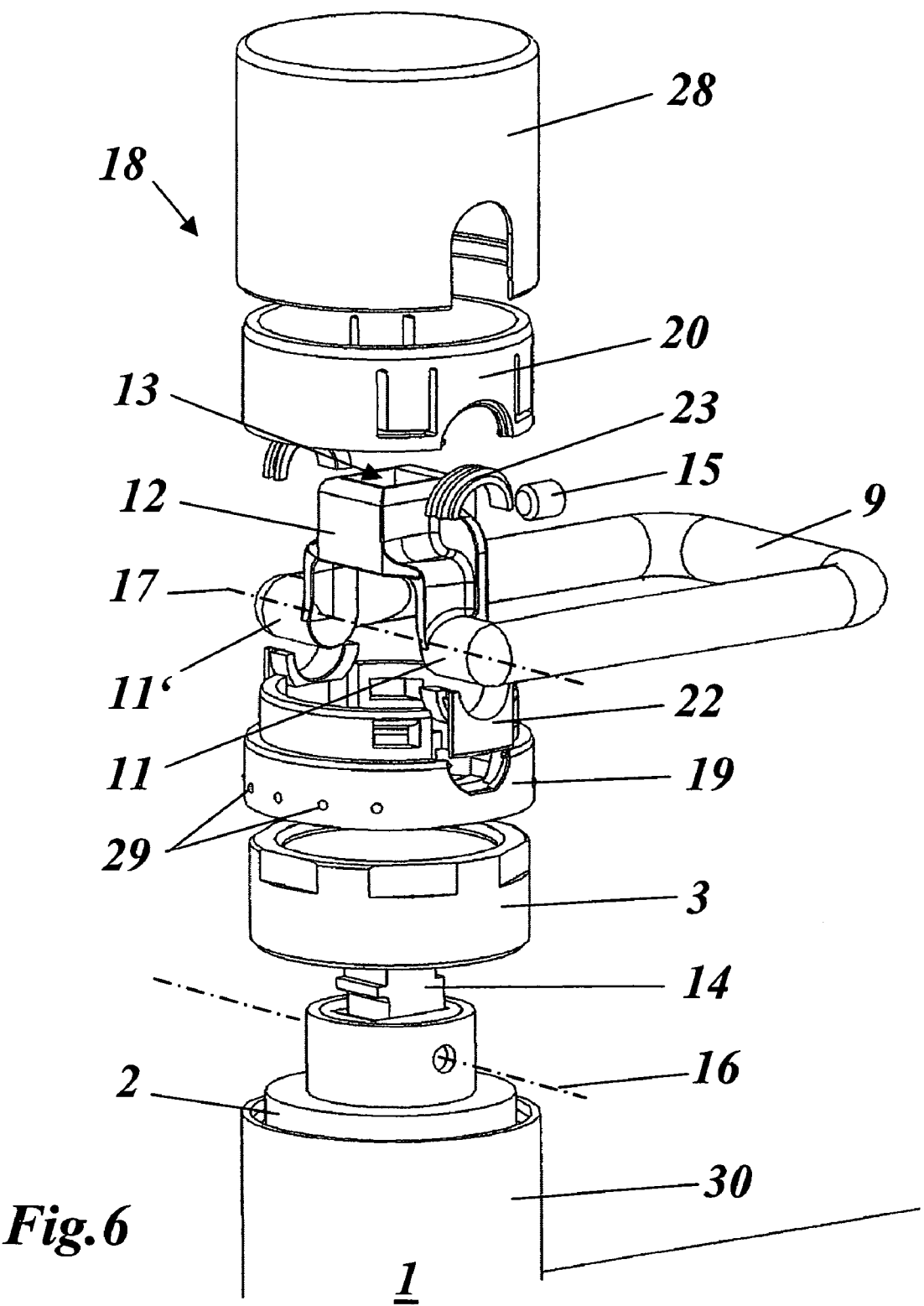
FIG. 6 shows a perspective exploded drawing of the handle head of the mixing valve from FIG. 3.
Figure 7:
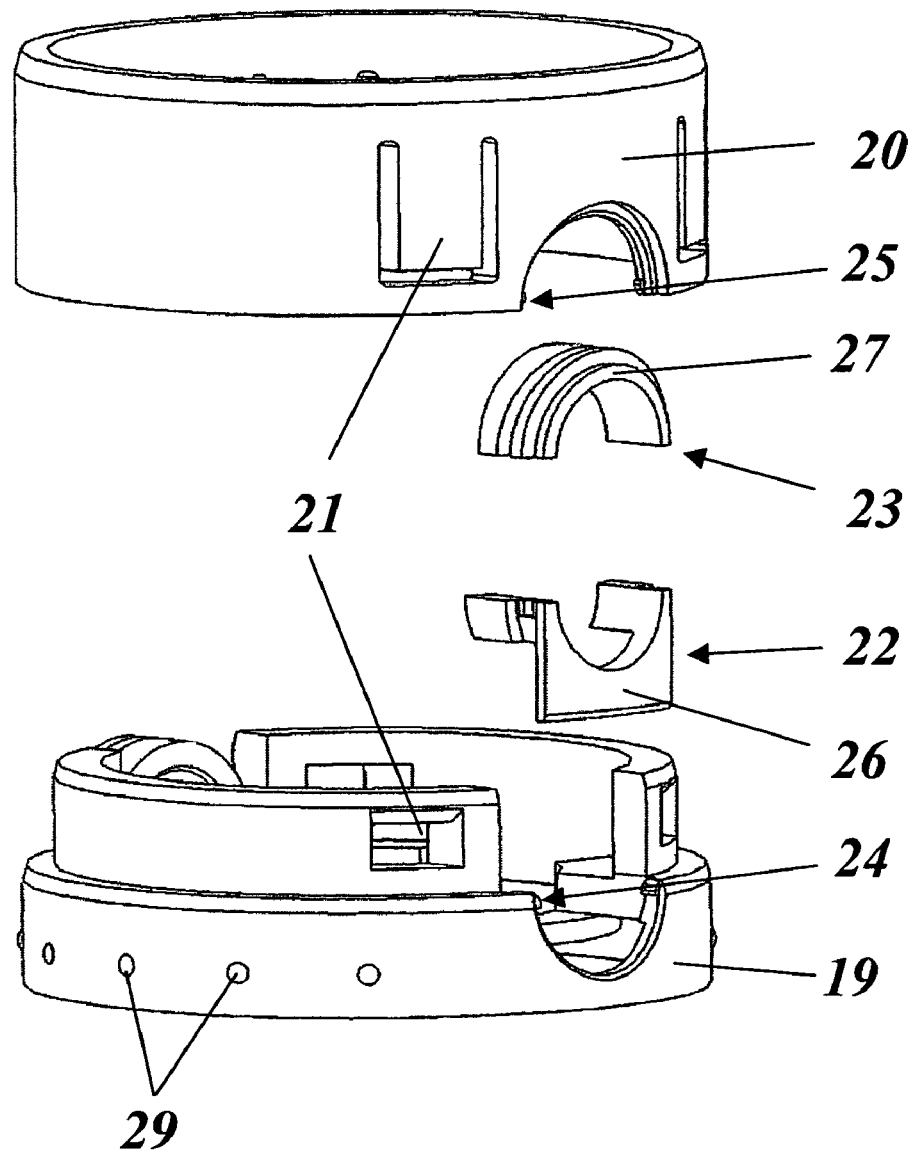
FIG. 7 shows a perspective exploded drawing of the guide sleeves and bearing halves in the handle head of the mixing valve from FIG. 3.

In FIGS. 1 to 5; a preferred exemplary embodiment of a mixing valve having a stirrup-shaped handle according to the invention is shown in two views (FIGS. 1, 2) and three sectional views (FIGS. 3-5). In FIGS. 6 and 7, the details of the associated handle head are reproduced in perspective exploded drawings. The invention can be used in a wall fitting for a washstand, a shower or a bath. However, the invention may also be used just as easily in a one-hole stand fitting for a washstand or a sink. In the one case, the cartridge with the actuating shank is arranged vertically upwards, in the other horizontally to the front or horizontally to the side.

In the mixing valve shown in FIGS. 1-7, a commercially available mixing cartridge 2 is installed in a fitting housing 1 and secured by means of a cap nut 3, which is tightened in the fitting housing 1 by means of a thread 4 (FIG. 3).

At the connecting point of fitting housing 1/mixing cartridge 2, the fitting housing 1 has various bores corresponding with the mixing cartridge 2 (FIG. 5). A hot-water inlet is designated by the reference numeral 5, a cold-water inlet is designated by 6, a mixing-water outlet is designated by 7 and two pins for the positioning of the mixing cartridge 2 are designated by 8. In a manner known per se, the mixing cartridge 2 contains a device for limiting the volumetric flow and a device for limiting the temperature, which are realized, for example, by two ceramic discs of appropriate design. On the top side of the mixing cartridge 2, an actuating shank 14 is pivotably arranged about a horizontal pivot axis 16 inside the handle head 18. The flow rate can be set in an infinitely variable manner by pivoting the actuating shank 14 about the pivot axis 16 by means of a stirrup-shaped handle 9. If the stirrup-shaped handle 9 is located in the position depicted by solid lines in FIG. 3, the mixing valve is closed. On the other hand, if the stirrup-shaped handle 9 is located in the position depicted by broken lines, the mixing valve is open.

Figure 1:
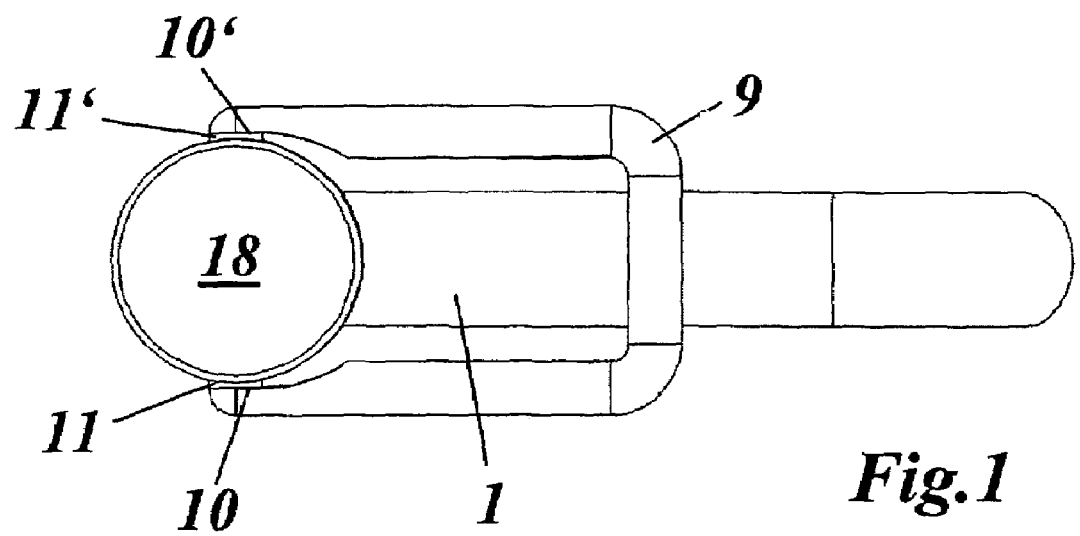
FIG. 1 shows a plan view of a mixing valve with stirrup-shaped handle according to a preferred exemplary embodiment of the invention.
Figure 2:
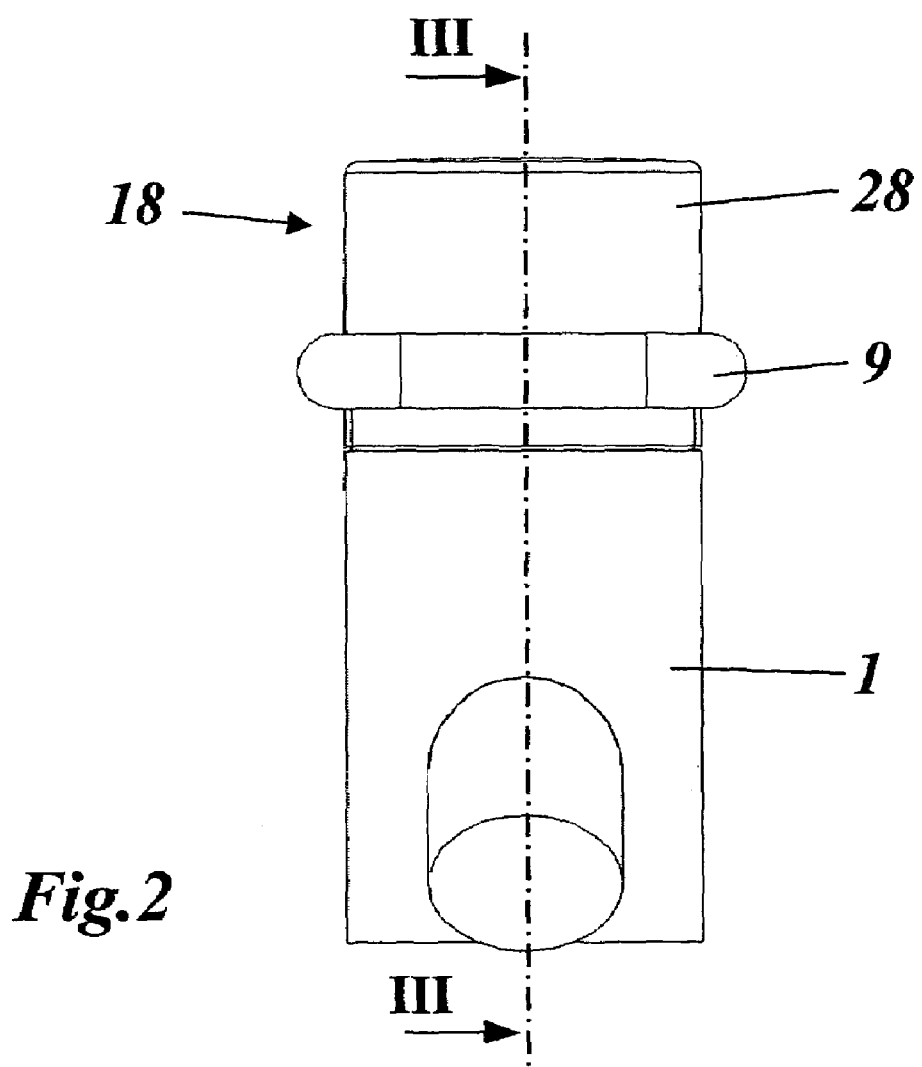
FIG. 2 shows a view from the front of the mixing valve from FIG. 1.

The stirrup-shaped handle 9, which in the exemplary embodiment shown has a rectangular basic shape and a round cross section, but may of course also have another configuration, merges at the handle head 18 into two surfaces 10, 10' formed on the inside (FIG. 1). Starting from these two surfaces 10, 10', a respective pin 11, 11' extends horizontally into the interior of the handle head 18 (FIGS. 1 and 4). The two pins 11, 11' are connected to one another in the interior of the handle head 18 via a yoke 12. The stirrup-shaped handle 9 with the integrally formed surfaces 10, 10', the two pins 11, 11' and the yoke 12 preferably form a cohesive, one-piece actuating element. The yoke 12 has a square aperture 13, in which the actuating shank 14 is suitably inserted and clamped in place laterally with a screw 15 (FIGS. 3 and 4). The other end of the actuating shank 14 engages in the cup of a connecting piece of the displaceable ceramic disc in the mixing cartridge 2 (not shown in the figures).

The pivot axis 16 of the actuating shank 14 is exactly in alignment with the rotation axis 17 of the pins 11, 11'. If the stirrup-shaped handle 9 is pivoted about the pivot axis 16 of the actuating shank 14 during the setting of the flow rate or during the opening or closing of the valve, as is shown in FIG. 3, the pins 11, 11' rotate about the rotation axis 17 without performing a lateral movement (transversely to the axis). As a result, it is possible to mount the pins 11, 11' in the handle head in such a way that there are no openings which are visible on the outside and which disturb the closed overall impression of the handle head and make cleaning of the handle head more difficult.

The pins 11, 11' are mounted in a bottom guide sleeve 19 and a top guide sleeve 20 (FIG. 7). The bottom and top guide sleeves 19 and 20 butt against one another at the level of the rotation axis 17 and are held by snap connections 21 after assembly. To mount the pins 11, 11', semicircular recesses are in each case provided diagonally opposite one another in the bottom and top guide sleeves 19 and 20, respectively. The actual mounting of the two pins 11, 11' inside the top and bottom guide sleeves 19 and 20, respectively, is effected in a respective bottom bearing half 22 and a respective top bearing half 23. These two parts are inserted into the semicircular recesses of the guide sleeves 19, 20 and are firmly connected to the guide sleeves 19, 20 by snap connections 24, 25 after assembly.

The end face 26 of the bottom bearing half 22, which is quadrilateral with, a semicircular cutout, and the end face 27 of the top bearing half 23, which has the form of a semi-circular ring, remain visible on the outside even after the assembly of the guide sleeves 19, 20 and the bearing halves 22, 23. The entire handle head 18 is covered by a hood 28, which has an encircling groove in the bottom region on the inside and is held in situ with removable friction fastening by some lugs 29 on the outer circumference of the bottom guide sleeve 19. The outside diameter of the hood 28 is identical to the outside diameter of the cartridge part 30 of the fitting housing 1.

After assembly, the two visible faces 26 and 27 of the bearing halves 22, 23 merge smoothly into the circumferential surfaces of the hood 28 and of the cartridge part 30. These two faces 26, 27 may be used without any problems as decorative or informative elements. They may have, for example, the same surface structure as the surface of the fitting. However, they may also be designed to be coloured, for example in blue/red for cold/hot.

The mixing valve shown in FIGS. 1 to 7 is only one exemplary embodiment. Other configurations are of course possible within the scope of the invention. Thus the stirrup-shaped handle 9 may have a basic shape deviating from the rectangle or may have a quadrilateral cross section. Instead of a circular cross section, the hood 28 may also have a quadrilateral cross section or a cross section of a different kind. It is in principle also conceivable to connect the stirrup-shaped handle 9 to the actuating shank 14 in the interior of the handle head 18 only via one pin. It is essential that a standard cartridge with limiting of the volumetric flow (flow rate) and the temperature can be used and that the pin/pins, entering the handle head, of the stirrup-shaped handle has/have a concentric rotation axis 17, which is in alignment with the pivot axis 16 of the actuating shank 14.

LIST OF DESIGNATIONS

1 Fitting housing
2 Mixing cartridge
3 Cap nut
4 Thread
5 Hot-water inlet
6 Cold-water inlet
7 Mixing-water outlet 8 Pin (positioning)
9 Stirrup-shaped handle
10, 10' Surface
11, 11' Pin
12 Yoke
13 Aperture (square)
14 Actuating shank
15 Screw
16 Pivot axis (actuating shank)
17 Rotation axis (pin 11)
18 Handle head
19 Bottom guide sleeve
20 Top guide sleeve
21 Snap connection
22 Bottom bearing half
23 Top bearing half
24, 25 Snap connection
26, 27 End face
28 Hood
29 Lug
30 Cartridge part (fitting housing 1)

The invention claimed is:

1. A single-lever mixing valve with a stirrup-shaped handle, the mixing valve comprising a mixing cartridge which is arranged in a fitting housing and projects with an actuating shank, pivotable about a pivot axis, into a handle head closed off to the outside, the actuating shank being actuatable by the stirrup-shaped handle via pins leading into the handle head, the pins being rotatably mounted about a rotation axis which is in alignment with the pivot axis of the actuating shank, a top and a bottom guide sleeve being connected to one another inside the handle head, and the pins being rotatably mounted between the two guide sleeves in a bearing formed from two bearing halves.

2. The single-lever mixing valve according to claim 1, wherein the two guide sleeves are releasably connected to one another by first snap connections.

3. The single-lever mixing valve according to claim 1, wherein the bearing halves are assigned to the guide sleeves and are each fastened to the associated guide sleeve.

4. The single-lever mixing valve according to claim 3, wherein the bearing halves are releasably fastened to the associated guide sleeves by second snap connections.

5. The single-lever mixing valve according to claim 1 wherein the bearing halves have end faces which are visible from outside the handle head.

6. The single-lever mixing valve according to claim 5, wherein the end faces are designed as decorative faces.

7. The single-lever mixing valve according to claim 5, wherein the end faces are designed to be colored, in particular red/blue, for marking the direction of rotation of the mixing valve in the sense of hot/cold.

8. A single-lever mixing valve with a stirrup-shaped handle, the mixing valve comprising a mixing cartridge which is arranged in a fitting housing and projects with an actuating shank, pivotable about a pivot axis, into a handle head closed off to the outside, it being possible for the actuating shank to be actuated by the stirrup-shaped handle via pins leading into the handle head, the pins being rotatably mounted about a rotation axis which is in alignment with the pivot axis of the actuating shank, a top and a bottom guide sleeve being connected to one another inside the handle head, the pins being rotatably mounted between the two guide sleeves, and the handle head being covered on the outside by a hood which can be put over the guide sleeves.

9. The single-lever mixing valve according to claim 8, wherein the hood is arranged concentrically to the guide sleeves, and is releasably held on the bottom guide sleeve.

10. The single-lever mixing valve according to claim 9, wherein lugs are arranged in a distributed manner on the outer circumference of the bottom guide sleeve in order to releasably retain the hood, these lugs being in engagement with an encircling groove on the inside of the hood.

11. The single-lever mixing valve according to claim 8, wherein the hood has corresponding recesses for putting over the pins.

12. A single-lever mixing valve with a stirrup-shaped handle, the mixing valve comprising a mixing cartridge which is arranged in a fitting housing and projects with an actuating shank, pivotable about a pivot axis, into a handle head closed off to the outside, it being possible for the actuating shank to be actuated by the stirrup-shaped handle via pins leading into the handle head, the pins being rotatably mounted about a rotation axis which is in alignment with the pivot axis of the actuating shank, a top and a bottom guide sleeve being connected to one another inside the handle head, the pins being rotatably mounted between the two guide sleeves and being connected to a yoke inside the handle head, which yoke is in turn releasably connected to the actuating shank.

13. The single-lever mixing valve according to claim 12, wherein the actuating shank is designed as a square, and wherein the yoke sits with a corresponding square aperture on the actuating shank.

14. The single-lever mixing valve according to claim 13, wherein the yoke is fixed on the actuating shank by means of a screw.

15. The single-lever mixing valve according to claim 12, wherein the stirrup-shaped handle, the pins and the yoke are sections of a one-piece actuating element.

* * * * *